(12) United States Patent
Nunez et al.

(10) Patent No.: US 10,738,866 B2
(45) Date of Patent: Aug. 11, 2020

(54) MODULAR ACTUATOR FOR PROVIDING RELATIVE MOTION BETWEEN TWO POINTS

(71) Applicants: Robert Bosch Mexico Sistemas Automotrices, S.A. de C.V., Toluca (MX); Robert Bosch GmbH, Stuttgart (DE)

(72) Inventors: Ivan Colin Nunez, Metepec (MX); Allan Dassaev Cadena Lopez, Toluca (MX)

(73) Assignees: Robert Bosch Mexico Sistemas Automotrices S.A. de C.V., Toluca (MX); Robert Bosch GmbH, Stuttgart (DE)

( * ) Notice: Subject to any disclaimer, the term of this patent is extended or adjusted under 35 U.S.C. 154(b) by 230 days.

(21) Appl. No.: 15/957,353

(22) Filed: Apr. 19, 2018

(65) Prior Publication Data

US 2019/0323585 A1  Oct. 24, 2019

(51) Int. Cl.
| | |
|---|---|
| *F16H 25/20* | (2006.01) |
| *F16H 57/031* | (2012.01) |
| *F16H 57/039* | (2012.01) |
| *F16H 57/02* | (2012.01) |

(52) U.S. Cl.
CPC ....... *F16H 25/2015* (2013.01); *F16H 57/031* (2013.01); *F16H 57/039* (2013.01); *F16H 2025/209* (2013.01); *F16H 2025/2031* (2013.01); *F16H 2057/02034* (2013.01)

(58) Field of Classification Search
CPC ..... F16H 2025/2031; F16H 2025/2034; F16H 2025/209; F16H 2025/2084; F16H 25/20; F16H 57/031; F16H 57/039; F16H 57/23; F16H 2057/02034; F16H 2057/02008; B60N 2/067; B60N 2/164; B60N 2/1853; B60N 2/233

See application file for complete search history.

(56) References Cited

U.S. PATENT DOCUMENTS

| | | | |
|---|---|---|---|
| 1,603,557 A * | 10/1926 | Schleier | F16H 1/166 74/427 |
| 6,176,145 B1 | 1/2001 | Jackson | |
| 8,109,164 B2 | 2/2012 | Tseng et al. | |
| 9,222,296 B2 | 12/2015 | Hamminga et al. | |
| 2002/0073790 A1 | 6/2002 | Wiesler et al. | |
| 2009/0199667 A1 * | 8/2009 | Menjak | B62D 1/181 74/424.7 |
| 2012/0227522 A1 * | 9/2012 | Wu | F16H 25/2454 74/89.14 |

(Continued)

*Primary Examiner* — Richard W Ridley
*Assistant Examiner* — Brian J McGovern
(74) *Attorney, Agent, or Firm* — Kelly McGlashen; Maginot, Moore & Beck LLP (57) ABSTRACT

An actuator provides linear motion between two points, and includes a motor, a spindle assembly and a gear assembly that connects the motor to a spindle of the spindle assembly and drives the spindle to rotate about a spindle axis. The gear assembly includes a gear housing that encloses gears and a portion of the spindle. The gear assembly including the gear housing is modular in that it includes features that allow it to be easily adapted by a rearrangement of components, and/or by substitution of certain components, to accommodate the requirements of multiple different applications.

15 Claims, 8 Drawing Sheets

(56) References Cited

U.S. PATENT DOCUMENTS

| | | |
|---|---|---|
| 2016/0138689 A1 | 5/2016 | Wu |
| 2017/0363189 A1* | 12/2017 | Nunez ................. F16H 25/2472 |
| 2019/0257397 A1* | 8/2019 | Wilkins ................. F16H 25/20 |

* cited by examiner

MODULAR ACTUATOR FOR PROVIDING RELATIVE MOTION BETWEEN TWO POINTS

BACKGROUND

Vehicles frequently include multiple actuators that are used to adjust the position of vehicle components to accommodate driver requirements. For example, the vehicle may include a seat positioning actuator that is used to adjust vehicle seat position, including fore-aft seat position. The vehicle may also include a steering column positioning actuator that is used to adjust the fore-aft position of a vehicle steering wheel within the passenger compartment of the vehicle. Additional actuators may be used to adjust seat tilt, seat height, etc. Some or all of the actuators may be, for example, linear actuators in the form of a drive motor that engages a spindle assembly via a gear assembly. The spindle assembly includes connection interfaces that secure the actuator to the vehicle and to the vehicle component to be moved. Each actuator used includes adaptations that accommodate the requirements of the specific application. Because of the large number of actuators used in vehicles, a need exists to be able to manufacture the actuators at a lower cost.

SUMMARY

In some aspects, an actuator includes a motor, a spindle assembly and a gear assembly that connects the motor to a spindle of the spindle assembly and drives the spindle to rotate about a spindle axis. The gear assembly includes a driven gear supported on the spindle so as to be fixed relative to the spindle, a drive gear that is configured to be driven by the motor and is engaged with the driven gear, and a gear housing. The gear housing encloses the driven gear and the drive gear, and includes a gear housing body and a cover that is detachable from the gear housing body. The gear housing body includes a first side, a first housing opening that is formed in the first side and that is surrounded by an outwardly protruding first flange, the first flange defining a first journal that supports a first portion of the spindle, a second side that is opposed to the first side, and a second housing opening formed in the second side. The cover overlies the second opening. The cover includes a plate portion having an inward-facing surface, an outward-facing surface and a cover opening formed therein, a second flange that protrudes inward from the inward-facing surface, the second flange extending into the second housing opening, and a third flange. The third flange protrudes outward from the outward-facing surface, surrounds the cover opening and defines a second journal. The second journal supports a second portion of the spindle. The gear assembly includes a first washer that includes a first washer opening. The first washer is disposed on the first side of the gear housing such that the first washer opening is aligned with the first housing opening. The gear assembly includes a second washer that includes a second washer opening. The second washer is disposed on the second side of the gear housing such that the second washer opening is aligned with the second housing opening. The first washer is secured to the second washer in such a way that the gear housing body and the cover are disposed between the first washer and the second washer, the second flange is retained in the second housing opening, and the spindle extends through the first washer opening and the second washer opening.

In some embodiments, one of the first washer and the second washer is a flat washer having a central opening, and the other of the first washer and the second washer is a flange portion of a connection interface that is configured to be connected to an external structure.

In some embodiments, the connection interface includes an interface housing that surrounds a portion of the spindle and is fixed to the gear housing, and a connection feature provided in the interface housing that enables a mechanical connection between the interface housing and an external structure.

In some embodiments, the interface housing includes a sidewall that is radially spaced from, and encircles, the spindle axis, the sidewall having a sidewall first end and a sidewall second end that is spaced apart from the sidewall first end, along the spindle axis, a sidewall end plate that closes the sidewall first end, the spindle passing through an opening in the sidewall end plate, and the flange portion that protrudes radially outward from the sidewall second end. In addition, the connection feature includes an opening in the sidewall.

In some embodiments, each of the first washer and the second washer includes a first plate portion that is fixed to the gear housing, has an opening that receives the spindle therethrough and that functions as a flat washer, and a second plate portion that adjoins the first plate portion and includes a connection feature that enables a mechanical connection between the second plate portion and an external structure.

In some embodiments, the spindle has a first end and an opposed second end. The spindle includes an external thread disposed between the first end and the second end. The driven gear is disposed on the spindle first end and has radially extending gear teeth, and the gear teeth are configured to engage the drive gear that drives the spindle to rotate about a spindle axis. The spindle assembly includes a fixed connection interface that is mounted on the gear housing and receives a portion of the spindle; and a movable connection interface mounted on the spindle. The movable connection interface is engaged with a portion of the external thread in such a way as to be moveable along the spindle axis relative to the first connection interface when the spindle is driven by the drive motor, and each of the fixed connection interface and the movable connection interface include a connection feature that enables a mechanical connection with an external structure.

In some embodiments, the fixed connection interface comprises a fixed interface housing that surrounds a portion of the spindle and a connection feature that enables a mechanical connection with an external structure. The fixed interface housing includes a sidewall that is radially spaced from, and encircles, the spindle axis, the sidewall having a sidewall first end and a sidewall second end that is spaced apart from the sidewall first end along the spindle axis, a sidewall end plate that closes the sidewall first end, the spindle passing through an opening in the sidewall end plate, and a flange portion that protrudes radially outward from the sidewall second end and corresponds to one of the first washer and the second washer. In addition, the connection feature includes an opening in the sidewall.

In some embodiments, the actuator includes a first stop fixed to the spindle, and a second stop fixed to the spindle in such a way as to be axially spaced apart from the first stop. The amount of axial displacement of the movable interface is determined by a distance between the first stop and the second stop.

In some embodiments, the spindle has a first end and an opposed second end, and includes an external thread disposed between the first end and the second end. The driven gear is disposed on the spindle first end and has radially extending gear teeth. The gear teeth are configured to engage the drive gear that drives the spindle to rotate about a spindle axis and translate along the spindle axis relative to the gear housing. The spindle assembly includes a fixed connection interface that is mounted on the gear housing and receives a portion of the spindle; and a movable connection interface mounted on the spindle so as to be fixed relative to the spindle. In addition, each of the fixed connection interface and the movable connection interface include a connection feature that enables a mechanical connection with an external structure.

In some embodiments, the first connection interface includes a first interface housing that surrounds a first portion of the spindle. The first interface housing includes a sidewall that is radially spaced from, and encircles, the spindle. The sidewall has a sidewall first end and a sidewall second end that is spaced apart from the sidewall first end along the spindle axis. The first interface housing has a sidewall end plate that closes the sidewall first end, and the spindle passes through an opening in the sidewall end plate. In addition, the first interface housing includes a flange portion that protrudes radially outward from the sidewall second end and corresponds to one of the first washer and the second washer.

In some embodiments, a first friction washer is mounted on the spindle, and the first friction washer is disposed in the gear housing between the driven gear and the gear housing first side. A second friction washer is mounted on the spindle, and the second friction washer is disposed in the gear housing between the driven gear and the gear housing second side. In addition, an elastic element is disposed between an inner surface of the gear housing and one of the first friction washer and the second friction washer.

In some embodiments, the spindle is metal and the driven gear is an over-molded plastic gear element that is fixed to the spindle so as to rotate with the spindle about the spindle axis.

In some embodiments, the driven gear is a spline integrally formed on the first end of the spindle.

In some embodiments, the driven gear is a part of a transmission element that is overmolded on an outer surface of the first end of the spindle. The transmission element includes the driven gear, a first support surface that is disposed on one side of the driven gear and that contacts and is supported on the first journal, and a second support surface is disposed on an opposed side of the driven gear and that contacts and is supported on the second journal.

In some embodiments, the first washer and the second washer are secured to each other via fasteners that pass through fastener openings in the cover and the gear housing body.

In some aspects, an actuator is provided that is modular in that it can be easily adapted by a rearrangement of components, and/or by substitution of certain components, to accommodate the requirements of multiple different applications. In particular, the actuator is a linear actuator that includes a drive motor that engages a spindle assembly via a gear assembly. In addition, the spindle assembly includes connection interfaces that secure the actuator to the an external support structure (for example, a vehicle) and to components to be moved (for example, elements of a vehicle steering column or seat). The gear assembly includes features that allow interconnection with the spindle assembly in a way that permits interchangeability in how components are configured, allowing for rearrangement or interchangeability of the components used with the actuator. The modular and/or interchangeable nature of the actuator allows the same drive motor, gearing and spindle assembly to be used for multiple applications by mere rearrangement of parts and or interchange of parts. As a result, manufacturing costs are reduced since fewer different assembly lines are required and fewer different parts are manufactured. Since the number of applications for the actuator is increased, the parts that are used in the actuator are produced at higher volumes, further lowering manufacturing costs.

DETAILED DESCRIPTION

Referring to FIGS. 1-6, an actuator 10 includes a DC drive motor 12, a spindle assembly 28 and a gear assembly 48 that connects the drive motor 12 to a spindle 30 of the spindle assembly 28 and drives the spindle 30 to rotate about a spindle axis 33. The drive motor 12 has a drive shaft 14 that terminates in a worm screw 16. The worm screw 16 serves as a drive gear and is engaged with a driven gear 21 that is fixed to the spindle 30. The drive motor 12 drives the spindle 30 to rotate about the spindle axis 33 via the driven gear 21. The worm screw 16 and the driven gear 21 are part of the gear assembly 48 and are enclosed in a gear housing 50 disposed at one end of the drive motor 12. The spindle assembly 28 includes a first connection interfaces 100 that is supported on the spindle 30 between opposed ends 31, 32 of the spindle 30. The first connection interfaces 100 is moved by the spindle 30 axially along the spindle axis 33 relative to the gear housing 50, which supports a second connection interface 110. The gear housing 50 encloses a portion of the spindle 30, and is reconfigurable in that it permits interchanging or repositioning of components of the gear and spindle assemblies 28, 48 in such a way as to provide modularity, as discussed further below. This, in turn, permits the actuator 10 to be configured in several different ways by rearrangement of a few components whereby a single actuator 10 can be used in multiple applications.

The spindle assembly 28 includes the spindle 30, a transmission element 20 that includes the driven gear 21, and the first connection interface 100.

The spindle 30 is a rigid, high-strength, single-piece element that has a first end 31, and an opposed, second end 32. The spindle axis 33 extends between first and second ends 31, 32, and corresponds to the axis of rotation of the spindle 30. In some embodiments, the spindle 30 is formed of metal, and the transmission element 20 is formed of plastic that has been over-molded onto the spindle first end 31. At the spindle first end 31, an outer surface of the spindle 30 is generally smooth and includes surface features 37, for example radial protrusions, that fix the over-molded transmission element 20 to the spindle first end 31. Between the first and second ends 31, 32, the outer surface of the spindle 30 includes a continuous helical external thread 34 which is engaged by first the connection interface 100, as discussed further below.

The transmission element 20 encloses the circumference of the spindle first end 31 as well as the end face 31*a* of the spindle first end 31. The transmission element 20 has radially extending gear teeth 22 that serve as the driven gear 21. Thus, the driven gear 21 is common to both the spindle assembly 28 and the gear assembly 48. The gear teeth 22 of the driven gear 21 are configured to engage the drive shaft worm screw 16 so that in use, the worm screw 16 drives the spindle 30 to rotate about the spindle axis 33. The transmission element 20 also includes a cylindrical first support surface 23 disposed on one side of the driven gear 21, and a cylindrical second support surface 24 disposed on an opposed side of the driven gear 21. The transmission element 20 is disposed within the gear housing 50 in such a way that the first and second support surfaces 23, 24 are bearing surfaces that support the spindle 30 with respect to the gear housing 50, as discussed further below.

The first connection interface 100 is disposed on the spindle 30 at a location spaced apart from the gear housing 50 so as to be disposed between to the spindle second end 32 and the gear housing 50. The first connection interface 100 consists of a first connection interface housing 108 that is a solid (e.g., non-hollow), unitary element. The first connection interface housing 108 has an axial through passage 104 configured to receive the spindle 30 therethrough. In particular, the through passage 104 extends between a proximal end 102 and a distal end 101 of the first connection interface housing 108, and includes an interior thread (not shown) that engages with the spindle external thread 34 in such a way that the first connection interface housing 108 moves along the spindle axis 33 relative to the gear housing 50 when the spindle 30 is driven to rotate by the drive motor 12. As used herein, the term distal end refers to an end that is further from the gear housing 50 than an opposed, or proximal end.

The first connection interface 100 includes a pair of first connection openings 105 that extend radially within the first connection interface housing 108. The first connection openings 105 are disposed on opposed sides of the first connection interface housing 108, whereby only one first connection opening 105 is visible in the figures. Each first connection opening 105 is a blind hole that is configured to enable a mechanical connection to be formed between the first connection interface 100 and an external structure, such as first telescoping sleeve of a steering column. For example, in the illustrated embodiment, each first connection opening 105 has a circular peripheral shape, and is configured to receive a first pin or a first pair of pins (not shown). The first connection interface 100 includes other features that can be used as an alternative to the opening 105 to enable connection to an external structure. For example, the first connection interface housing 108 has an outer geometry 109 in the shape of a truncated cylinder that can be used to form a connection to an external device having an opening with a complimentary truncated cylindrical geometry.

The spindle assembly 28 also includes first and second stop plates 93, 95 that are supported on the spindle 30 and determine a range of axial displacement of the first connection interface 100 along the spindle axis 33. The first and second stop plates 93, 95 are each annular and include a central opening 97, and the spindle 30 extends through the stop plate central openings 97. The first stop plate 93 is disposed at the spindle second end 32, and serves to retain the first connection interface 100 on the spindle 30 and to limit the extent of travel of the first connection interface 100 along the spindle axis 33 in a direction away from the gear housing 50. In addition, a stop clip 94, positioned on a distal side of the first stop plate 93, is disposed in a circumferential groove 38 located at the spindle second end 32. The stop clip 94 retains the first stop plate 93 on the spindle second end 32. The second stop plate 95 is disposed between the first connection interface 100 and the gear housing 50, and serves to limit the extent of travel (e.g., the stroke) of the first connection interface 100 along the spindle axis 33 in a direction toward the gear housing 50. The second stop plate 95 abuts the end plate 116 of the second connection interface housing 118, and the amount of axial displacement of the first connection interface 100 interface between the first stop plate 93 and the second stop plate 95 is determined by the axial length of the second stop plate 95.

The gear assembly 48 includes the worm screw (drive gear) 16 that is secured to the drive motor output shaft 14, and the transmission element 20 including the driven gear 21 that is supported on the spindle 30 so as to be fixed relative to the spindle 30. As previously discussed, the driven gear 21 is engaged with, and driven by, the worm screw 16. The gear assembly 48 includes the gear housing 50 that encloses the driven gear 21 and the worm screw 16, as well as assembly support components such as friction washers 90, 91 and an elastic member 92, as discussed further below. In addition, the gear assembly 48 includes first and second washers 70, 80 which are provided on opposed outer surfaces of the gear housing 50 in such a way as to provide structural reinforcement to the gear housing 50 and to facilitate retention of the gear assembly 48 and gear housing 50 in an assembled configuration, as discussed further below.

The gear housing 50 includes a gear housing body 59 and a cover 60 that is formed separately from, and is detachably connected to, the gear housing body 59. The gear housing body 59 has a first side 53 and a second side 55 that is opposed to the first side 53. The first and second sides 53, 55 are parallel to each other and generally transverse to the spindle axis 33. In addition, the first and second sides 53, 55 are disposed on opposed sides of the gear assembly 48.

A first housing opening 54 is formed in the first side 53. The first housing opening 54 is a circular opening that is centered on the spindle axis 33 and is surrounded by a first flange 57. The first flange 57 protrudes outwardly from the the first side. An inner surface of the first flange 57 has the same dimensions as the first housing opening 54, and defines a first journal 58. The first journal 58 supports, for rotation, a first portion 35 of the spindle 30 that is enclosed by the transmission element first support surface 23. The first journal 58 is dimensioned to receive, and support for rotation, the transmission element first support surface 23.

A second housing opening 56 is formed in the second side 55. The second housing opening 56 is a circular opening that is centered on the spindle axis 33 and has a greater diameter than the first housing opening 54. The second housing opening 56 is sufficiently large to permit insertion of the components 48 of the gear assembly 48 during assembly.

The cover 60 is shaped and dimensioned to close the second housing opening 56. More specifically, the cover 60 is a thin plate that includes an inward-facing surface 62 that faces and abuts the gear housing body 59, and an outward-facing surface 63 that is opposed to the inward-facing surface 62 and is spaced apart from the inward-facing surface 62 by the thickness of the plate. A circular cover opening 64 is formed in the cover 60. When the cover 60 is assembled with the gear housing body 59, the cover opening 64 is concentric with the spindle axis 33, and receives the spindle 30 therethrough.

The cover 60 includes a second flange 65 that protrudes inward from the cover inward-facing surface 62. The second flange 65 surrounds the cover opening. In addition, the second flange 65 is disposed between, and spaced apart from, the cover opening 64 and an outer peripheral edge 61 of the cover 60. The second flange 65 protrudes into the second housing opening 56, and an outer diameter of the second flange 65 corresponds to a diameter of the second housing opening 56.

In addition to the second flange 65, the cover 60 includes a third flange 66. The third flange 66 protrudes outwardly from the cover outward-facing surface 63 and surrounds the cover opening 64. An inner surface of the third flange 66 has the same dimensions as the cover opening 64, and defines a second journal 67. The second journal 67 supports, for rotation, a second portion 36 of the spindle 30 that is enclosed by the transmission element second support surface 24. The second journal 67 is dimensioned to receive, and support for rotation, the transmission element first support surface 24.

The cover 60 includes tabs 68 that protrude outward from the peripheral edge 61. In the illustrated embodiment, the cover 60 includes four tabs 68, but a greater or few number of tabs 68 may be provided. A hole 69 is formed in each tab. The holes 69 are shaped and dimensioned to receive fasteners such as bolts 96 that are used to retain the cover 60 on the gear housing body 59 and maintain the gear assembly 48 in an assembled configuration, as discussed further below.

The gear assembly 48 includes annular first and second friction washers 90, 91 that are disposed in the gear housing 50 on opposite sides of the driven gear 21, and mounted on the spindle so as to surround a corresponding support surface 23, 24 of the transmission element. In particular, the first friction washer 90 is disposed between the driven gear 21 and an inner surface of the gear housing first side 53, and the second friction washer 91 is disposed between the driven gear 21 and the gear housing second side 55. More specifically, a radially-outward portion of the second friction washer 91 faces an end face 65a of the second flange 65, while a radially-inward portion of the second friction washer 91 faces an annular elastic element 92. The elastic element 92 may be, for example, an annular spring such as a belleville washer or wave washer, and is disposed in a space defined between the cover inward-facing surface 62, the second flange 65, the second friction washer 91 and the transmission second support surface 24. The elastic element 92 urges the first and second friction washers 90, 91 and driven gear 21 toward the gear housing first side 53, ensuring axial contact between driven gear 21 and the first and second friction washers 90, 91 regardless of wear conditions within the gear assembly 48 over time.

The gear assembly 48 includes the first and second washers 70, 80, which are thin plates having a central opening 73, 83. In the illustrated embodiment, the first washer 70 is embodied by the second connection interface flange 117, and is disposed on the outer surface of the gear housing first side 53 such that the first washer opening 73 is concentric with the first housing opening 54. The second washer 80 is a plain washer that is disposed on the outer surface of the second side 55 of the gear housing 50 (e.g., on the cover outward-facing surface 63) such that the second washer opening 83 is concentric with the second housing opening 56 and the cover opening 64. Each of the first and second washers 70, 80 include tabs 78, 88 that protrude outward from their respective peripheral edge. The number of tabs 78, 88 and location of the tabs 78, 88 corresponds to the number and location of tabs 68 provided in the cover 60. Thus, in the illustrated embodiment, each of the first and second washers 70, 80 include four tabs 78, 88. A hole 79, 89 is formed in each tab. The holes 79, 89 are shaped and dimensioned to receive the fasteners 96 that are used to retain the cover 60 on the gear housing body 59 and maintain the gear assembly 48 in an assembled configuration, as discussed further below. The holes 79 formed in the tabs 78 of the first washer 70 are threaded.

The first washer 70 and the second washer 80 are secured to each other via the fasteners 96. The fasteners 96 pass through tab openings (holes) 69, 79, 89 in the cover 60, the first washer 70 and the second washer 80 as well as through passages in the gear housing body 59, and engage the threads of the holes 79 of the first washer 70. As a result, the gear housing is retained in the assembled configuration illustrated in FIGS. 1-6. In addition, the first washer 70 is secured to the second washer 80 in such a way that the gear housing body 59 and the cover 60 are disposed (e.g., clamped) between the first washer 70 and the second washer 80, the second flange 65 is retained in the second housing opening 56, and the spindle 30 extends through the first washer opening 73 and the second washer opening 83.

The actuator 10 further includes a second connection interface 110 that is supported on and secured to the outer surface of the gear housing 50, and receives a portion of the spindle 30 therethrough. The second connection interface 110 includes a hollow, cylindrical second connection interface housing 118 and a pair of opposed second connection openings 115 formed in the second connection interface housing 118 that serve as a feature that is used to secure the second connection interface housing 118 to an external structure (not shown) such as a vehicle seat or steering column. The second connection interface housing 118 has a cylindrical sidewall 113 that is radially spaced apart from the spindle 30, and an integral end plate 116 that closes a distal end 111 of the sidewall 113. The end plate 116 has a central opening 114 through which the spindle 30 protrudes. The proximal end 112 of the sidewall 113 is open, and is surrounded by a radially outwardly-extending flange 117 that abuts and is fixed to, an outer surface of the gear housing 50, as discussed further below.

The second connection openings 115 extend radially through the sidewall 113. The second connection openings 115 are disposed on opposed sides of the first connection interface housing 118, whereby only one first connection opening 115 is visible in the figures. In some embodiments, each of the second connection openings 115 include a reinforcing, friction-reducing sleeve 119. Each second connection opening 115 is configured to enable a mechanical connection to be formed between the second connection interface 110 and an external structure, such as a second telescoping sleeve of a steering column. For example, in the illustrated embodiment, the second connection openings 115 have a circular peripheral shape, and are configured to receive pins (not shown) in a press fit.

In some embodiments, the gear housing 50, including the gear housing body 59 and the cover 60, are formed of plastic. In such embodiments, the second washer 80 may be formed of metal, and thus stiffens and otherwise structurally reinforces the gear housing 50. The second connection interface 110, including the integral flange 117 that corresponds to the second washer 70, may be formed of plastic or metal, and further serves to stiffen and structurally reinforce the gear housing 50.

In use, when the drive motor 12 is operating in a forward direction, the spindle 30 is driven to rotate in a first direction (for example, a clockwise direction) about the spindle axis 33. As a result, the first connection interface 100 moves linearly in a proximal direction toward the second connection interface 110 and the gear housing 50 due to engagement of the threads of the first connection interface 100 and the spindle exterior thread 34. When the drive motor 12 is operating in a reverse direction, the spindle 30 is, driven to rotate in a second direction (for example, a counter-clockwise direction) about the spindle axis 33. As a result, the first connection interface 100 moves linearly in a distal direction away from the second connection interface 110 and the gear housing 50. In particular, the second connection interface 110 is fixed to the gear housing first side 53, and the first connection interface 100 moves toward or away from the second connection interface 110 along the spindle axis 33, depending on the rotation direction of the spindle 30. The extent to which the first connection interface 100 can travel is limited by the first stop plate 93 in one direction, and the second stop plate 95 in the opposed direction.

Figure 1:
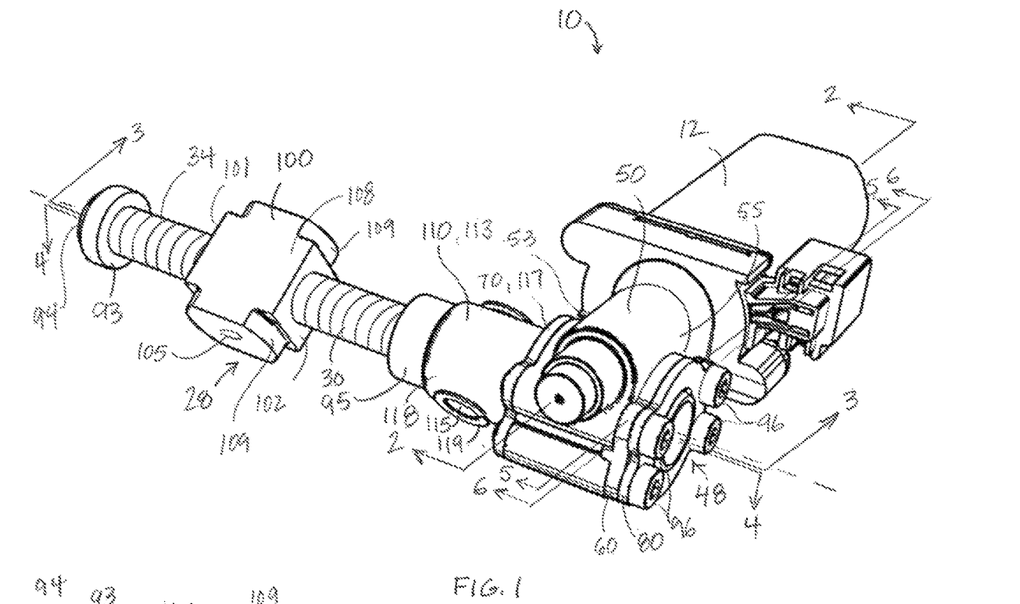
FIG. 1 is a perspective view of an actuator including a DC drive motor and a spindle that is connected to the DC drive motor via a speed reducing gear unit.
Figure 2:
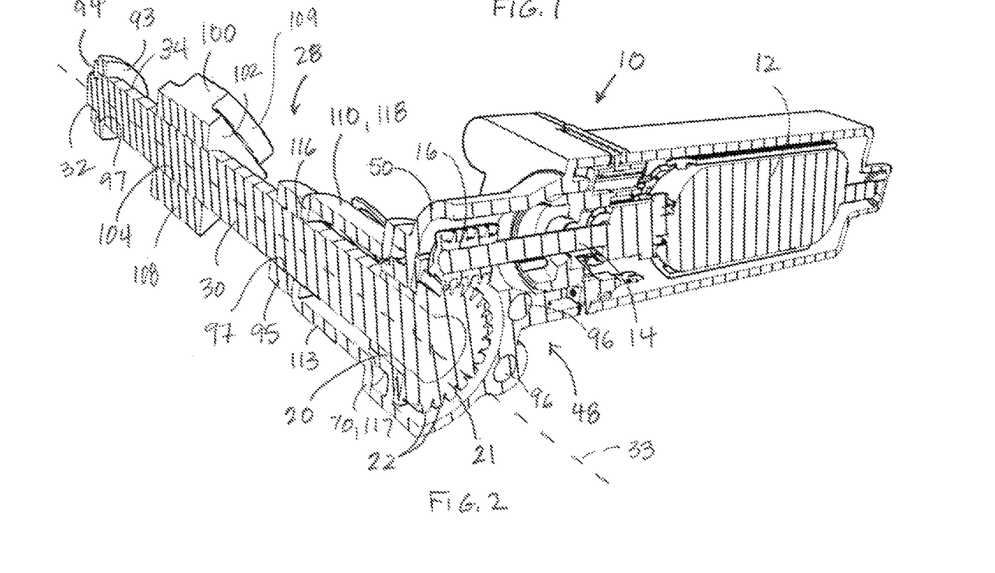
FIG. 2 is a cross sectional view of the actuator of FIG. 1 as seen along lines 2-2 and 3-3 of FIG. 1.
Figure 3:
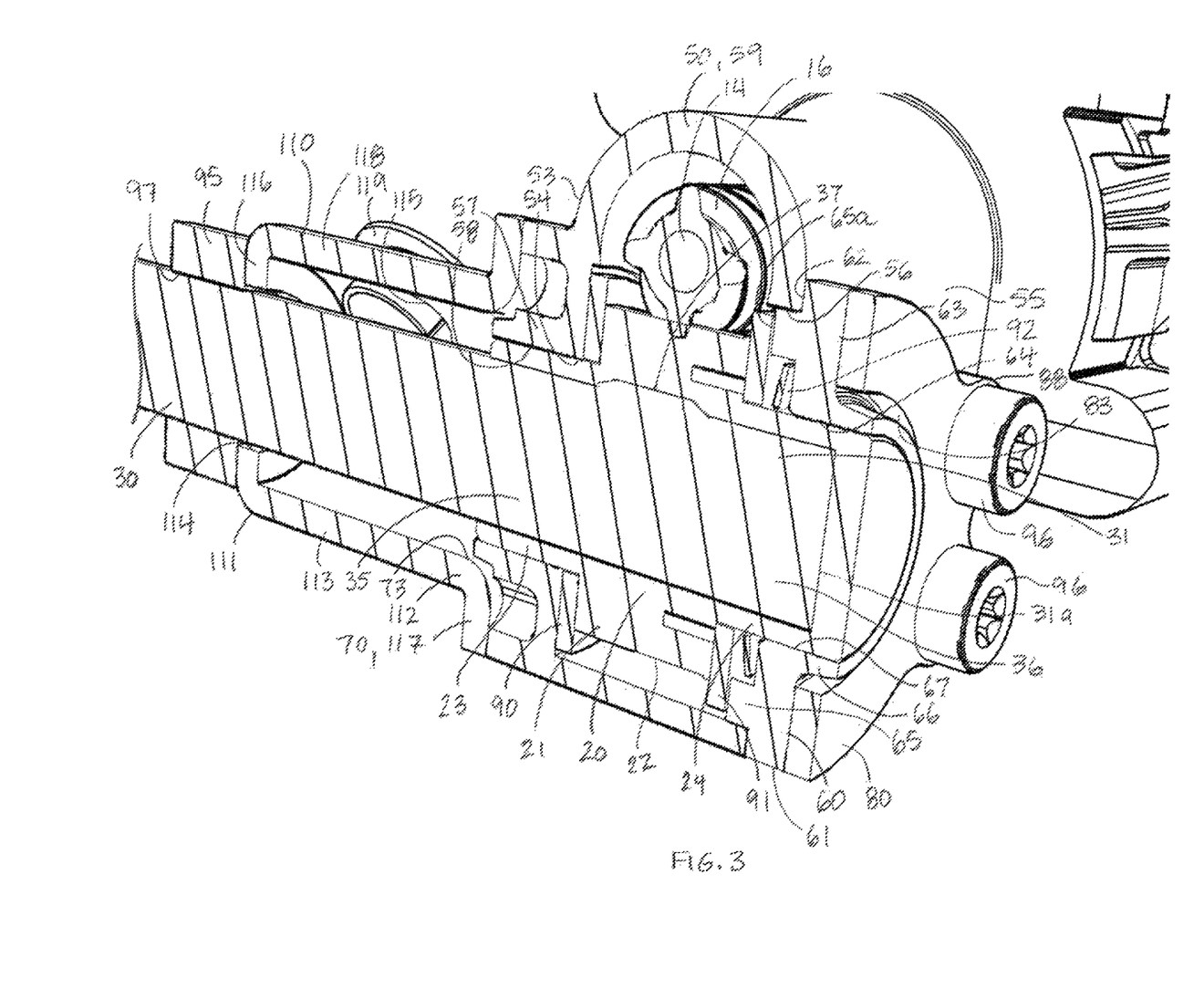
FIG. 3 is an enlarged cross sectional view of a portion of the actuator of FIG. 1 as seen along line 3-3 of FIG. 1, illustrating features of the gear assembly.
Figure 4:
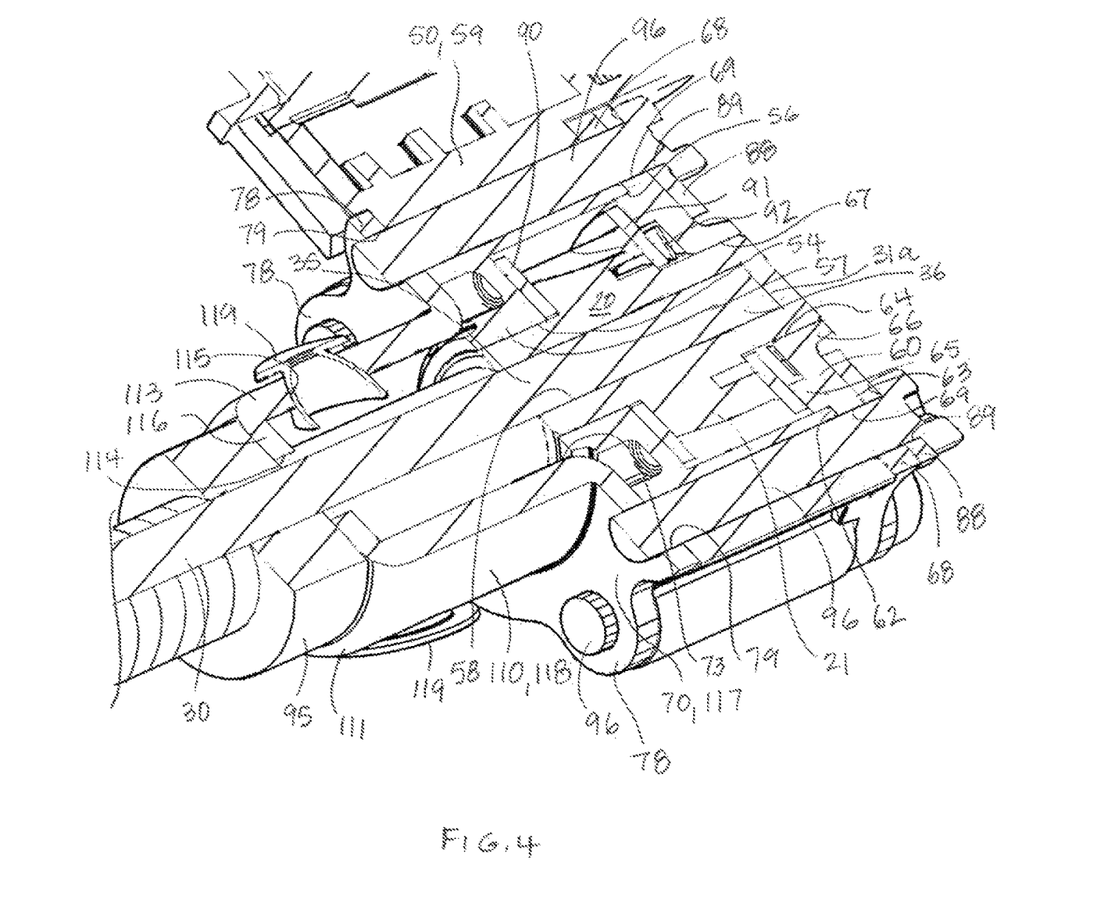
FIG. 4 is an enlarged cross sectional view of a portion of the actuator of FIG. 1 as seen along line 4-4 of FIG. 1, illustrating additional features of the gear assembly.
Figure 5:
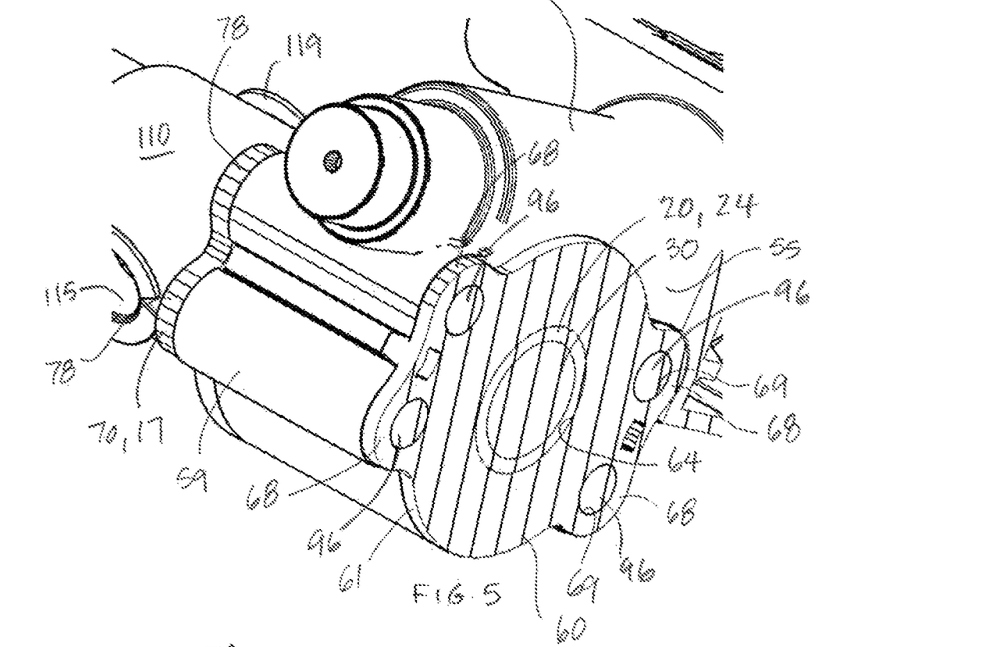
FIG. 5 is an enlarged cross sectional view of a portion of the actuator of FIG. 1 as seen along line 5-5 of FIG. 1, illustrating features of the cover.
Figure 6:
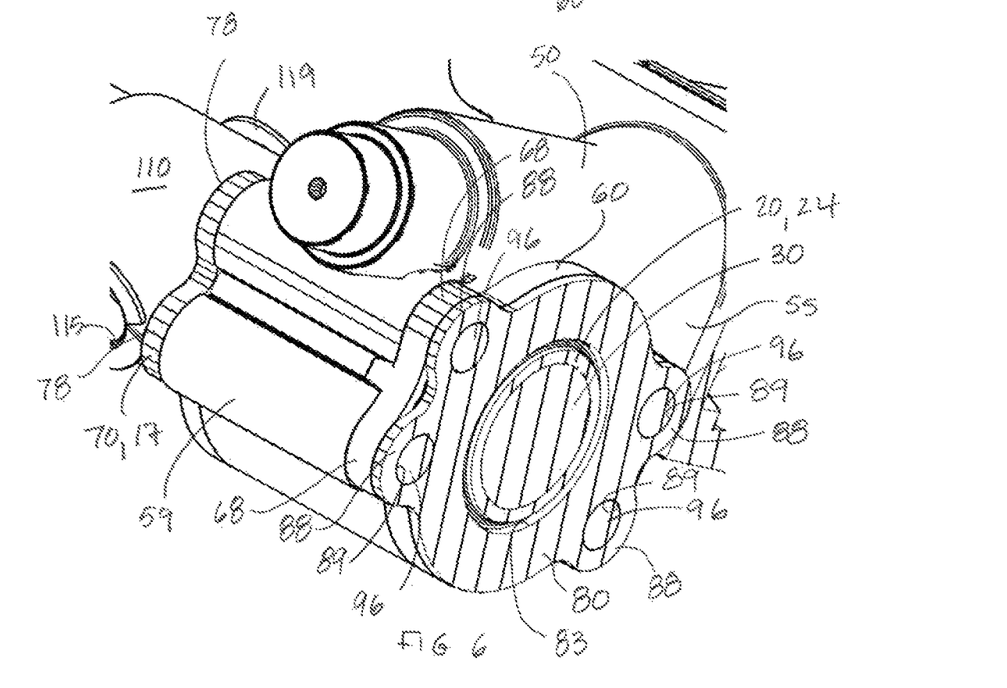
FIG. 6 is an enlarged cross sectional view of a portion of the actuator of FIG. 1 as seen along line 6-6 of FIG. 1, illustrating features of the washer.
Figure 7:
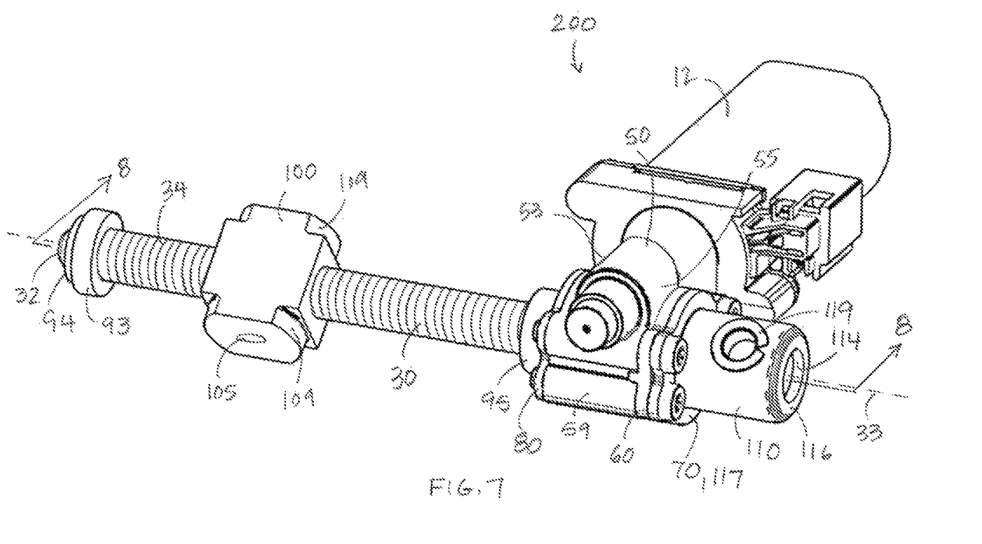
FIG. 7 is a perspective view of an alternative embodiment actuator.
Figure 8:
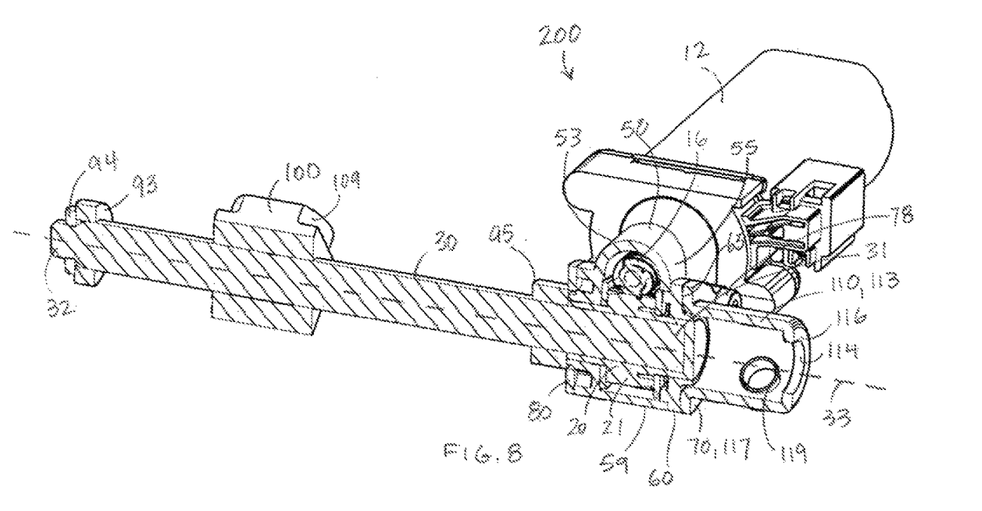
FIG. 8 is a cross sectional view of the actuator of FIG. 7 as seen along line 8-8 of FIG. 7.

Referring to FIGS. 7 and 8, an alternative embodiment actuator 200 is similar to the actuator 10 described above with respect to FIGS. 1-6, and common elements will be referred to using common reference numbers. The alternative embodiment actuator 200 differs from the actuator 10 described above with respect to FIGS. 1-6 in that the actuator 200 includes a rearrangement of certain elements of the gear assembly 48. In particular, the actuator 200 includes the second washer 80 disposed on the gear housing first side 53, and the second connection interface 110 disposed on the gear housing second side 55. The second connection interface 110 is oriented such that the flange 117 that corresponds to the first washer 70 abuts the cover outward-facing surface 63.

In the actuator 200, the first washer 70 and the second washer 80 perform the same functions as in the embodiment illustrated in FIGS. 1-6. That is, the first washer 70 and the second washer 80 are secured to each other via the fasteners 96. The fasteners 96 pass through tab openings 69, 79, 89 in the cover 60, the first washer 70 and the second washer 80 as well as through passages in the gear housing body 59. As a result, the gear housing is retained in the assembled configuration illustrated in the FIGS. 7 and 8. In addition, the first washer 70 is secured to the second washer 80 in such a way that the gear housing body 59 and the cover 60 are disposed (e.g., clamped) between the first washer 70 and the second washer 80, the second flange 65 is retained in the second housing opening 56, and the spindle 30 extends through the first washer opening 73 and the second washer opening 83.

In use, when the drive motor 12 is operating in a forward direction, the spindle 30 is driven to rotate in a first direction (for example, a clockwise direction) about the spindle axis 33. As a result, the first connection interface 100 moves linearly in a proximal direction toward the gear housing 50 due to engagement of the threads of the first connection interface 100 and the spindle exterior thread 34. When the chive motor 12 is operating in a reverse direction, the spindle 30 is driven to rotate in a second direction (for example, a counter-clockwise direction) about the spindle axis 33. As a result, the first connection interface 100 moves linearly in a distal direction away from the gear housing 50. In particular, the second connection interface 110 is fixed to the gear housing second side 55, and the first connection interface 100 moves toward or away from the gear housing 50 along the spindle axis 33, depending on the rotation direction of the spindle 30. The extent to which the first connection interface 100 can travel is limited by the first stop plate 93 in one direction, and the second stop plate 95 in the opposed direction.

Figure 9:
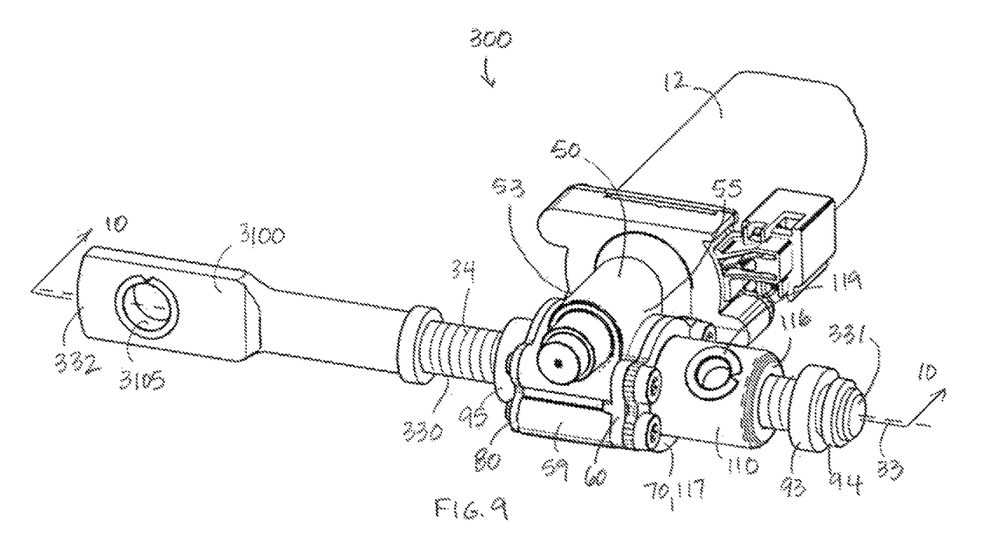
FIG. 9 is a perspective view of another alternative embodiment actuator.
Figure 10:
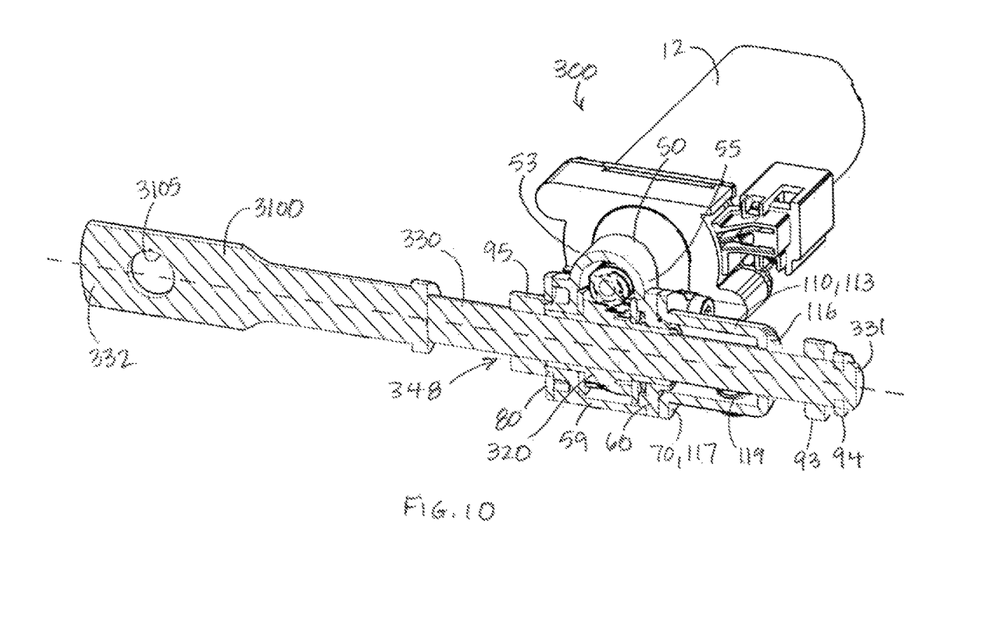
FIG. 10 is a cross sectional view of the actuator of FIG. 9 as seen along line 10-10 of FIG. 9.

Referring to FIGS. 9 and 10, another alternative embodiment actuator 300 is similar to the actuator 200 described above with respect to FIGS. 7 and 8, and common elements will be referred to using common reference numbers. The alternative embodiment actuator 300 differs from the actuator 200 described above with respect to FIGS. 7-8 in that the actuator 300 includes an alternative spindle 330, an alternative transmission element 320, and an alternative first connection interface 3100. In addition, the gear assembly 348 is configured so that the first connection interface 3100 is fixed relative to the spindle 330, and the spindle 330 moves relative to the transmission element 320 and the gear housing 50, as discussed further below.

The spindle 330 is a rigid, high-strength, single-piece element that has a first end 331, and an opposed, second end 332. The spindle axis 33 extends between first and second ends 331, 332, and corresponds to the axis of rotation of the spindle 330. In some embodiments, the spindle 330 is formed of metal. Between the first and second ends 331, 332, the outer surface of the spindle 330 includes a continuous helical external thread 34 which is engaged by an internal thread (not shown) provided on an inner surface of the transmission element 320, as discussed further below.

The transmission element 320 encloses a circumference of the spindle 330 at a location disposed between the spindle first and second ends 331, 332. The transmission element 320 is part of a gear assembly 348 that is identical to the gear assembly 48 described above with respect to FIGS. 1-6, except that the transmission element 20 of FIGS. 1-6 is replaced by the alternative transmission element 320. As in the earlier embodiments, the transmission element 320 includes the radially-outwardly extending gear teeth 22 that serve as the driven gear 21, as well as the first and second support surfaces 23, 24 that are rotatably supported in the journals 58, 67 of the gear housing 50. In addition, the transmission element 320 includes the helical internal thread that is formed on its spindle-facing surface, and is open at both axial ends. The internal thread is configured to engage with the spindle external thread 34, and the rotation of the work screw 16 is transmitted to the spindle 330 via the driven gear 21 and the internal thread.

The first connection interface 3100 is fixed (for example, by crimping) to, or formed integrally with, the spindle second end 332. The first connection interface 3100 is a rectangular plate that has a width that is greater than a diameter of the spindle 330, and a thickness that is less than the diameter of the spindle 330, where the width and thickness directions are orthogonal to each other and to the spindle axis 33. The first connection interface 3100 has a first connection opening 3105 formed therein that extends through the plate in the thickness direction. Thus, the first connection opening 3105 is a through hole that is configured to enable a mechanical connection to be formed between the first connection interface 100 and an external structure.

In use, when the drive motor 12 is operating in a forward direction, the spindle 330 is driven to rotate in a first direction (for example, a clockwise direction) about the spindle axis 33. As a result, the spindle 330 moves linearly such that both the spindle 330 and the first connection interface 3100 translate axially in a first direction due to engagement of the threads of the transmission element 320 and the spindle exterior thread 34. When the drive motor 12 is operating in a reverse direction, the spindle 330 is driven to rotate in a second direction (for example, a counterclockwise direction) about the spindle axis 33. As a result, the spindle 330 moves linearly such that both the spindle 330 and the first connection interface 3100 translate axially in a second direction that is opposed to the first direction. The extent to which the first connection interface 3100 can travel is limited by the first stop plate 93 in one direction, and the second stop plate 95 in the opposed direction. In the illustrated embodiment, the first stop plate 93 is disposed on the spindle first end 331, and the second stop plate 95 is disposed at the gear housing first side.

Figure 11:
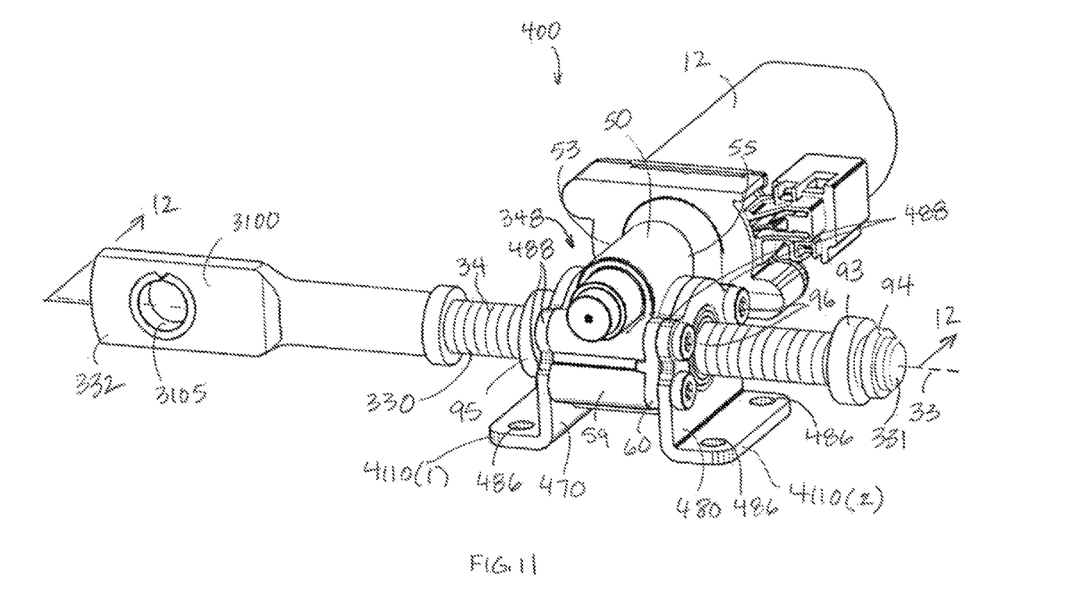
FIG. 11 is a perspective view of another alternative embodiment actuator.
Figure 12:
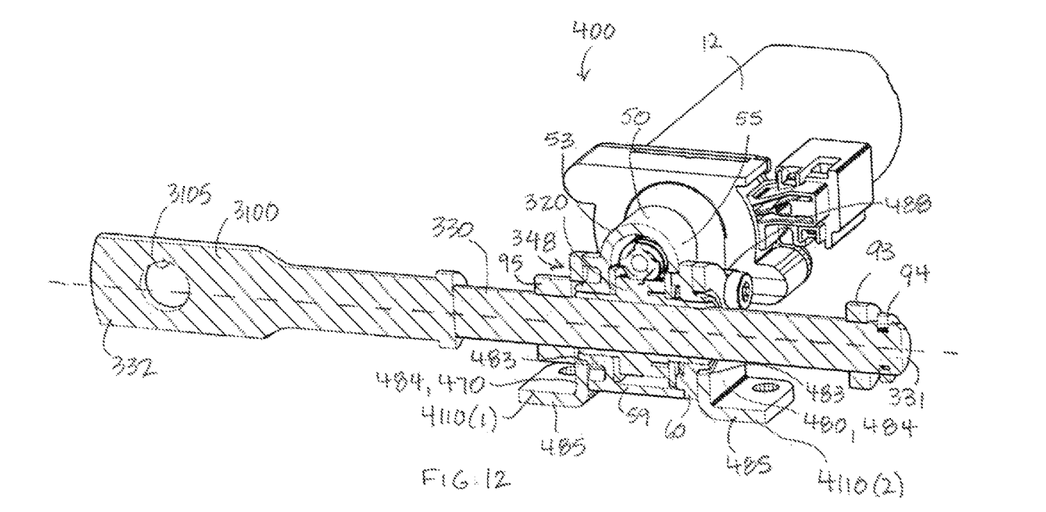
FIG. 12 is a cross sectional view of the actuator of FIG. 11 as seen along line 12-12 of FIG. 11.

Referring to FIGS. 11 and 12, another alternative embodiment actuator 400 is similar to the actuator 10 described above with respect to FIGS. 9 and 10, and common elements will be referred to using common reference numbers. The alternative embodiment actuator 400 differs from the actuator 300 described above with respect to FIGS. 9 and 10 in that the actuator 400 includes a pair of alternative second connection interfaces 4110(1), 4110(2). Like the above-described embodiments, a portion of each of the second connection interfaces 4110(1), 4110(2) provides the washers 470, 480 that structurally reinforce the gear housing 50 and retain the gear assembly 348 in the assembled configuration illustrated in FIGS. 11 and 12.

The actuator 400 includes two second connection interfaces 4110(1), 4110(2) that are disposed on the spindle 330 such that a second connection interface 4110 is disposed on each of the first and second sides 53, 55 of the gear housing 50. The two second connection interfaces 4110(1), 4110(2) are identical, and so only one second connection interface 4110(2) will be described.

The second connection interface 4110(2) is a plate shaped member of uniform thickness that is bent into an L-shaped configuration that includes a first plate portion 484 and a second plate portion 485. The second plate portion 485 extends from one edge of, and is oriented perpendicular to, the first plate portion 484. The first plate portion 484 fractions as the plain washer 480, and has a washer opening 483 that receives the spindle 330 therethrough. The first plate portion 484 is disposed on the outer surface of the second side 55 of the gear housing 50 (e.g., on the cover outward-facing surface 63) such that the washer opening 483 is concentric with the second housing opening 56 and the cover opening 64. The first plate portion 484 includes tabs 488 that protrude outward from a peripheral edge of the first plate portion 484. The number of the tabs 488 and location of the tabs 488 corresponds to the number and location of tabs 68 provided in the cover 60. Thus, in the illustrated embodiment, the first plate portion 484 includes include four tabs 488. A hole 489 (not visible in FIGS. 11 and 12 since the hole is obscured by the fastener 96) is formed in each tab. The holes 489 are shaped and dimensioned to receive the fasteners 96 that are used to retain the cover 60 on the gear housing body 59 and maintain the gear assembly 348 in an assembled configuration, as discussed further below.

The second plate portion 485 adjoins one edge of the first plate portion 484, and includes a pair of through holes 486 that are configured to receive fasteners and enable a mechanical connection between the second plate portion 485 and an external structure. In the illustrated embodiment, the second plate portion 485 is generally rectangular, and the through holes 486 are spaced apart in a direction transverse to the spindle axis 33.

The two second connection interfaces 4110(1), 4110(2) are disposed on the spindle 330 such that one (e.g., the inner) second connection interface 4110(1) is disposed on the gear housing first side 53, and the other (e.g., the outer) connection interface 4110(2) is disposed on the gear housing second side 55. The first washer 470 is embodied by the first plate portion 484 of the inner second connection interface 4110(1), which abuts the outward-facing surface of the gear housing first side 53. In addition, the second washer 480 is embodied by the first plate portion 484 of the outer second connection interface 4110(2). The second plate portion 485 of both the inner and outer second connection interfaces 4110(1), 4110(2) extends away from the gear housing 50. As a result, the inner and outer second connection interfaces 4110(1), 4110(2) have a mirrored orientation.

The first washer 470 and the second washer 480 are secured to each other via the fasteners 96. The fasteners 96 pass through tab openings 69, 489 in the cover 60, the first washer 470 and the second washer 480 as well as through passages in the gear housing body 59. As a result, the gear housing 50 is retained in the assembled configuration illustrated in FIGS. 11 and 12. In addition, the first washer 470 is secured to the second washer 480 in such a way that the gear housing body 59 and the cover 60 are disposed (e.g., clamped) between the first washer 470 and the second washer 480, the second flange 65 is retained in the second housing opening 56, and the spindle 330 extends through the washer openings 483 of both inner and outer second connection interfaces 4110(1), 4110(2).

Like the embodiment illustrated in FIGS. 9 and 10, the gear assembly 348 is configured so that the first connection interface 3100 is fixed relative to the spindle 330, and the spindle 330 moves relative to the gear housing 50. Thus, in use, when the drive motor 12 is operating in a forward direction, the spindle 330 is driven to rotate in a first direction (for example, a clockwise direction) about the spindle axis 33. As a result, the spindle 330 moves linearly such that both the spindle 330 and the first connection interface 3100 translate axially in a first direction due to engagement of the threads of the transmission element 320 and the spindle exterior thread 34. When the drive motor 12 is operating in a reverse direction, the spindle 330 is driven to rotate in a second direction (for example, a counterclockwise direction) about the spindle axis 33. As a result, the spindle 330 moves linearly such that both the spindle 330 and the first connection interface 3100 translate axially in a second direction that is opposed to the first direction. The extent to which the first connection interface 3100 can travel is limited by the first stop plate 93 in one direction, and the second stop plate 95 in the opposed direction. In the illustrated embodiment, the first stop plate 93 is disposed on the spindle first end 331, and the second stop plate 95 is disposed at the gear housing first side.

Figure 13:
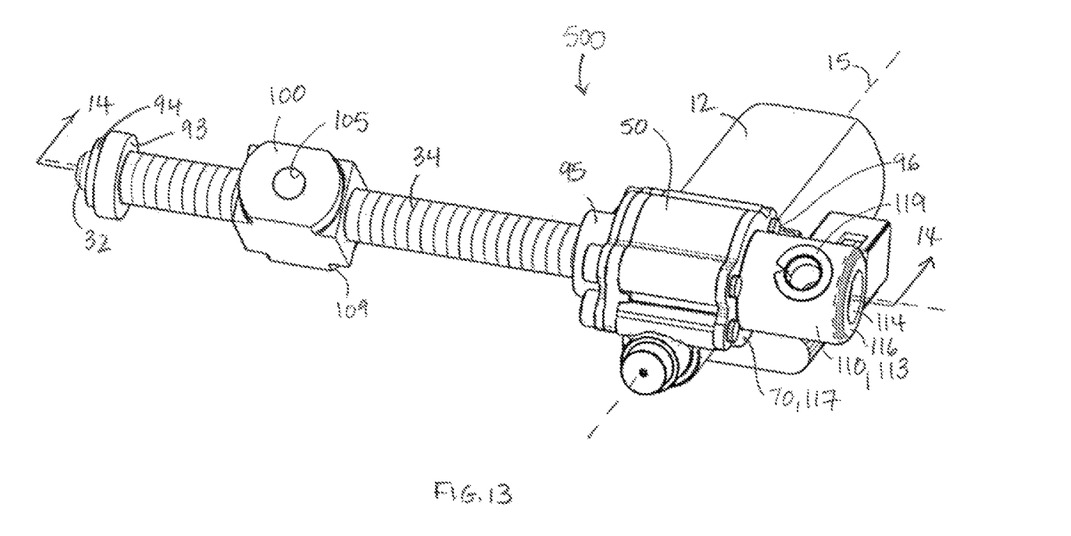
FIG. 13 is a perspective view of another alternative embodiment actuator.
Figure 14:
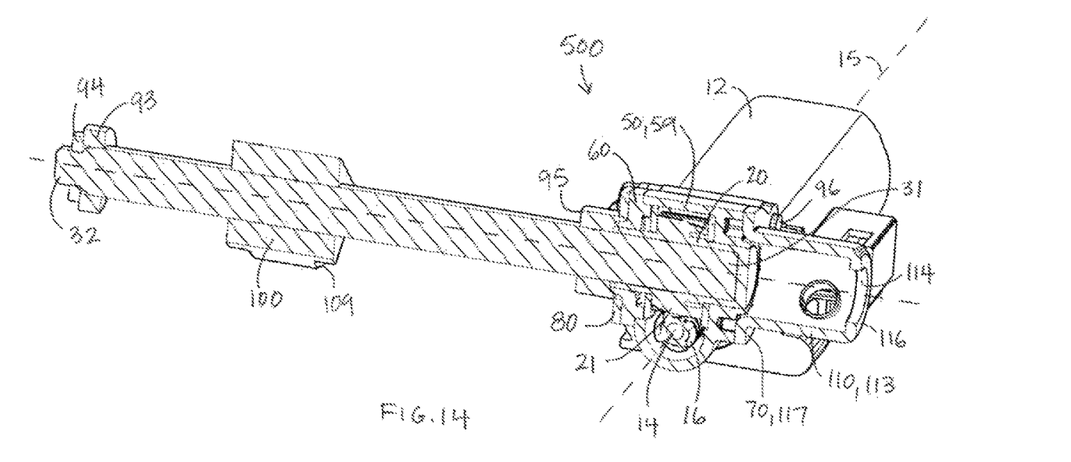
FIG. 14 is a cross sectional view of the actuator of FIG. 13 as seen along line 14-14 of FIG. 13.

Referring to FIGS. 13 and 14, another alternative embodiment actuator 500 is similar to the actuator 100 described above with respect to FIGS. 7-8, and common elements will be referred to using common reference numbers. The alternative embodiment actuator 500 differs from the actuator 10 described above with respect to FIGS. 7-8 in that the drive motor 12 and gear assembly 48 are rotated 180 degrees about the longitudinal axis 15 of the drive motor output shaft 14. Thus, in the actuator 500, all elements are common with the elements described with respect to FIGS. 7-8, while some elements have been rearranged. As seen in FIGS. 13 and 14, it is possible to rotate the gear assembly 48 including the gear housing 50 to provide "mirrored" assembly relative to that of FIGS. 7-8 due to the symmetry of the components used to form the actuators 200, 500. The ability to rearrange and/or reorient various elements of the actuator 200, 500 allows flexibility in packaging and also allows the actuator 200, 500 to be used in a greater variety of applications.

Although the spindle 30, 330 is described herein as being a single-piece element, it is not limited to being a single-piece element. For example, in some embodiments, the spindle 30, 330 is manufactured in multiple pieces that are then joined to form a single, integrated unit. Moreover, the spindle 30, 330 is not limited to being formed by any one process or of any one material. The number of elements used to form the spindle 30, 330 and the materials and processes used to form the spindle 30, 330, are determined by the requirements of the specific application.

Although the spindle 30 is described herein as including the overmolded transmission element that includes the driven gear 21, the spindle 30 is not limited to this configuration. For example, in some embodiments, the driven gear is a spline that is integrally formed on the first end of the spindle 30.

Although the actuator 10, 200, 300, 400, 500 is described herein as including the DC drive motor 12, it is not limited to employing this type of motor. Other appropriate types of motors can be used, and the specific motor used is determined by the requirements of the specific application.

Although the actuator 10, 200, 300, 400, 500 is described herein as having application to vehicle component adjustment, it is not limited to this application. Alternative applications, include, but are not limited to, for non-vehicle applications that require relative linear motion such as may occur in manufacturing, robotics, etc.

Selective illustrative embodiments of the system and device are described above in some detail. It should be understood that only structures considered necessary for clarifying the system and device have been described herein. Other conventional structures, and those of ancillary and auxiliary components of the system and device, are assumed to be known and understood by those skilled in the art. Moreover, while a working example of the system and device have been described above, the system and device are not limited to the working examples described above, but various design alterations may be carried out without departing from the system and device.

What is claimed is:

1. An actuator comprising a motor, a spindle assembly and a gear assembly that connects the motor to a spindle of the spindle assembly, the spindle including a spindle axis, the gear assembly comprising:
  a driven gear supported on the spindle;
  a drive gear that is configured to be driven by the motor and is engaged with the driven gear;
  a gear housing that encloses the driven gear and the drive gear, the gear housing including a gear housing body and a cover that is detachable from the gear housing body,
    the gear housing body including
      a first side,
      a first housing opening that is formed in the first side and that is surrounded by an outwardly protruding first flange, the first flange defining a first journal that supports a first portion of the spindle,
      a second side that is opposed to the first side, and
      a second housing opening formed in the second side,
    the cover overlying the second housing opening, the cover including
      a plate portion having an inward-facing surface, an outward-facing surface and a cover opening formed therein,
      a second flange that protrudes inward from the inward-facing surface, the second flange extending into the second housing opening, and
      a third flange that protrudes outward from the outward-facing surface, the third flange surrounding the cover opening and defining a second journal, the second journal supporting a second portion of the spindle;
  a first washer that includes a first washer opening, the first washer disposed on the first side of the gear housing body such that the first washer opening is aligned with the first housing opening; and
  a second washer that includes a second washer opening, the second washer disposed on the second side of the gear housing body such that the second washer opening is aligned with the second housing opening,
  wherein
  the first washer is secured to the second washer in such a way that
    the gear housing body and the cover are disposed between the first washer and the second washer,
    the second flange is retained in the second housing opening, and
    the spindle extends through the first washer opening and the second washer opening.

2. The actuator of claim 1, wherein
  one of the first washer and the second washer is a flat washer having a central opening, and
  the other of the first washer and the second washer is a flange portion of a connection interface that is configured to be connected to an external structure.

3. The actuator of claim 2, wherein the connection interface includes
  an interface housing that surrounds a third portion of the spindle and is fixed to the gear housing, and
  a connection feature provided in the interface housing that enables a mechanical connection between the interface housing and the external structure.

4. The actuator of claim 3, wherein the interface housing includes
  a sidewall that is radially spaced from, and encircles, the spindle axis, the sidewall having a sidewall first end and a sidewall second end that is spaced apart from the sidewall first end along the spindle axis,
  a sidewall end plate that closes the sidewall first end, the spindle passing through an opening in the sidewall end plate, and
  the flange portion that protrudes radially outward from the sidewall second end, and the connection feature includes an opening in the sidewall.

5. The actuator of claim 1, wherein
each of the first washer and the second washer includes
a first plate portion that is fixed to the gear housing, has an opening that receives the spindle therethrough and that functions as a flat washer, and
a second plate portion that adjoins the first plate portion and includes a connection feature that enables a mechanical connection between the second plate portion and an external structure.

6. The actuator of claim 1, wherein
the spindle has a first end and an opposed second end, the spindle including an external thread disposed between the first end and the second end,
the driven gear is disposed on the spindle first end and has radially extending gear teeth, the gear teeth configured to engage the drive gear that drives the spindle to rotate about the spindle axis, and
the spindle assembly includes
a fixed connection interface that is mounted on the gear housing and receives a third portion of the spindle; and
a movable connection interface mounted on the spindle,
wherein the movable connection interface is engaged with a portion of the external thread in such a way as to be moveable along the spindle axis relative to the fixed connection interface when the spindle is driven by the drive motor, and each of the fixed connection interface and the movable connection interface includes a connection feature that enables a mechanical connection with an external structure.

7. The actuator of claim 6, wherein
the fixed connection interface, comprises a fixed interface housing that surrounds a portion of the spindle and the connection feature that enables the mechanical connection with the external structure,
the fixed interface housing includes
a sidewall that is racially spaced from, and encircles, the spindle axis, the sidewall having a sidewall first end and a sidewall second end that is spaced apart from the sidewall first end along the spindle axis,
a sidewall end plate that closes the sidewall first end, the spindle passing through an opening in the sidewall end plate, and
a flange portion that protrudes radially outward from the sidewall second end and corresponds to one of the first washer and the second washer, and
the connection feature includes an opening in the sidewall.

8. The actuator of claim 6, comprising a first stop fixed to the spindle and a second stop fixed to the spindle in such a way as to be axially spaced apart from the first stop, wherein the amount of axial displacement of the movable connection interface is determined by a distance between the first stop and the second stop.

9. The actuator of claim 1, wherein
the spindle has a first end and an opposed second end, the spindle including an external thread disposed between the first end and the second end,
the driven gear is disposed on the spindle first end and has radially extending gear teeth, the gear teeth configured to engage the drive gear, and
the spindle assembly includes
a fixed connection interface that is mounted on the gear housing and receives a third portion of the spindle; and
a movable connection interface mounted on the spindle so as to be fixed relative to the spindle, and
each of the fixed connection interface and the movable connection interface include a connection feature that enables a mechanical connection with an external structure.

10. The actuator of claim 9, wherein the fixed connection interface includes
a first interface housing that surrounds the third portion of the spindle, the first interface housing including
a sidewall that is radially spaced from, and encircles, the spindle, the sidewall having a sidewall first end and a sidewall second end that is spaced apart from the sidewall first end along the spindle axis,
a sidewall end plate that closes the sidewall first end, the spindle passing through an opening in the sidewall end plate, and
a flange portion that protrudes radially outward from the sidewall second end and corresponds to one of the first washer and the second washer.

11. The actuator of claim 1, comprising
a first friction washer mounted on the spindle, the first friction washer disposed in the gear housing between the driven gear and the gear housing body first side;
a second friction washer mounted on the spindle, the second friction washer disposed in the gear housing between the driven gear and the gear housing body second side; and
an elastic element disposed between an inner surface of the gear housing and one of the first friction washer and the second friction washer.

12. The actuator of claim 1, wherein the spindle is metal and the driven gear is an over-molded plastic gear element that is fixed to the spindle so as to rotate with the spindle about the spindle axis.

13. The actuator of claim 1, wherein the driven gear is a spline integrally formed on a first end of the spindle.

14. The actuator of claim 1, wherein the driven gear is a part of a transmission element that is overmolded on an outer surface of a first end of the spindle, the transmission element including
the driven gear,
a first support surface that is disposed on one side of the driven gear and that contacts and is supported on the first journal, and
a second support surface is disposed on an opposed side of the driven gear and that contacts and is supported on the second journal.

15. The actuator of claim 1, wherein the first washer and the second washer are secured to each other via fasteners that pass through fastener openings in the cover and the gear housing body.

* * * * *

UNITED STATES PATENT AND TRADEMARK OFFICE
CERTIFICATE OF CORRECTION

PATENT NO. : 10,738,866 B2
APPLICATION NO. : 15/957353
DATED : August 11, 2020
INVENTOR(S) : Ivan Colin Nunez and Allan Dassaev Cadena Lopez It is certified that error appears in the above-identified patent and that said Letters Patent is hereby corrected as shown below:

In Claim 7, at Column 15, Line 35, delete the "," between the words "interface" and "comprises".

In Claim 7, at Column 15, Line 40, delete the word "racially" and insert the word --radially-- in its place.

Signed and Sealed this
Eighth Day of December, 2020

Andrei Iancu
*Director of the United States Patent and Trademark Office*